(12) United States Patent
Haruta et al.

(10) Patent No.: US 9,920,162 B2
(45) Date of Patent: Mar. 20, 2018

(54) HEAT-SHRINKABLE POLYESTER FILM

(71) Applicant: TOYOBO CO., LTD., Osaka-shi, Osaka (JP)

(72) Inventors: Masayuki Haruta, Tsuruga (JP); Shintaro Ishimaru, Tsuruga (JP); Takuro Endo, Inuyama (JP)

(73) Assignee: Toyobo Co., Ltd., Osaka (JP)

( * ) Notice: Subject to any disclaimer, the term of this patent is extended or adjusted under 35 U.S.C. 154(b) by 284 days.

(21) Appl. No.: 14/424,339

(22) PCT Filed: Aug. 28, 2013

(86) PCT No.: PCT/JP2013/072971
§ 371 (c)(1),
(2) Date: Feb. 26, 2015

(87) PCT Pub. No.: WO2014/034704
PCT Pub. Date: Mar. 6, 2014

(65) Prior Publication Data
US 2015/0218308 A1   Aug. 6, 2015

(30) Foreign Application Priority Data

Aug. 29, 2012 (JP) ................. 2012-188508

(51) Int. Cl.
*C08G 63/123*  (2006.01)
*C08G 63/16*  (2006.01)
(Continued)

(52) U.S. Cl.
CPC ............ *C08G 63/183* (2013.01); *B29C 55/14* (2013.01); *B29C 61/003* (2013.01);
(Continued)

(58) Field of Classification Search
None
See application file for complete search history.

(56) References Cited

U.S. PATENT DOCUMENTS 4,059,667 A * 11/1977 Pangonis .............. B29C 55/143
264/216
5,223,544 A * 6/1993 Burkett .................. B01J 19/24
521/41
(Continued)

FOREIGN PATENT DOCUMENTS

JP    H01-127317 A    5/1989
JP    H09-239833 A    9/1997
(Continued)

OTHER PUBLICATIONS

Japanese Patent Office, International Search Report in International Patent Application No. PCT/JP2013/072971 (dated Nov. 19, 2013).

*Primary Examiner* — Vivian Chen
(74) *Attorney, Agent, or Firm* — Leydig, Voit & Mayer, Ltd.

(57) ABSTRACT

The invention provides a heat-shrinkable polyester film with high mechanical strength in a width direction that is orthogonal to the main shrinking direction and high tensile rupture elongation in the film width direction after being subjected to an aging treatment in a high-temperature environment. The heat-shrinkable polyester film is made from a polyester resin containing ethylene terephthalate as the main component and a monomer component that can serve as an amorphous component in an amount of 0 mol % or more and less than 1 mol % relative to the total amount of polyester resin components.

10 Claims, 1 Drawing Sheet

(51) Int. Cl.
*C08G 63/18* (2006.01)
*C08G 63/181* (2006.01)
*C08G 63/183* (2006.01)
*B32B 27/36* (2006.01)
*C08L 67/02* (2006.01)
*C08L 67/03* (2006.01)
*B29C 55/14* (2006.01)
*B29C 61/00* (2006.01)
*B29K 67/00* (2006.01)

(52) U.S. Cl.
CPC ......... *B29K 2067/003* (2013.01); *B32B 27/36* (2013.01); *C08G 63/123* (2013.01); *C08G 63/16* (2013.01); *C08G 63/18* (2013.01); *C08G 63/181* (2013.01); *C08L 67/02* (2013.01); *C08L 67/03* (2013.01); *Y10T 428/1328* (2015.01); *Y10T 428/1331* (2015.01); *Y10T 428/31786* (2015.04)

(56) References Cited

U.S. PATENT DOCUMENTS

| | | | | |
|---|---|---|---|---|
| 6,599,994 B2* | 7/2003 | Shelby | ............... | B29C 61/003 428/34.9 |
| 6,623,821 B1* | 9/2003 | Kendig | ............... | B32B 7/12 428/34.9 |
| 7,344,765 B2* | 3/2008 | Hayakawa | ............... | B32B 27/08 428/212 |
| 7,829,655 B2* | 11/2010 | Endo | ............... | B29C 55/146 264/176.1 |
| 8,329,828 B2* | 12/2012 | Endo | ............... | B29C 55/14 264/176.1 |
| 8,722,161 B2* | 5/2014 | Haruta | ............... | B29C 55/143 264/235.8 |
| 9,017,782 B2* | 4/2015 | Haruta | ............... | B29C 61/003 428/192 |
| 9,074,092 B2* | 7/2015 | Neill | ............... | B32B 27/06 |
| 9,080,027 B2* | 7/2015 | Haruta | ............... | C08J 5/18 |
| 9,296,867 B2* | 3/2016 | Haruta | ............... | B29C 61/003 |
| 2002/0090502 A1* | 7/2002 | Ito | ............... | B32B 1/08 428/304.4 |
| 2003/0170427 A1* | 9/2003 | Ito | ............... | B29C 55/005 428/156 |
| 2006/0063008 A1* | 3/2006 | Inagaki | ............... | B32B 27/36 428/423.1 |
| 2007/0099017 A1* | 5/2007 | Hayakawa | ............... | B32B 27/08 428/480 |
| 2009/0270584 A1* | 10/2009 | Endo | ............... | B29C 55/146 528/308.1 |
| 2009/0304997 A1* | 12/2009 | Haruta | ............... | B29C 61/003 428/156 |
| 2010/0247845 A1* | 9/2010 | Haruta | ............... | B29C 55/143 428/98 |
| 2010/0256309 A1* | 10/2010 | Endo | ............... | B29C 55/14 525/384 |
| 2010/0260951 A1* | 10/2010 | Haruta | ............... | B29C 61/003 428/35.1 |
| 2010/0331513 A1* | 12/2010 | Kim | ............... | C08J 5/18 528/272 |
| 2011/0143123 A1* | 6/2011 | Ito | ............... | B32B 27/36 428/323 |
| 2013/0008821 A1* | 1/2013 | Haruta | ............... | C08J 5/18 206/459.5 |
| 2013/0034673 A1 | 2/2013 | Haruta et al. | | |
| 2015/0014202 A1* | 1/2015 | Haruta | ............... | B29C 61/003 206/459.5 |
| 2015/0175756 A1* | 6/2015 | Haruta | ............... | C08J 5/18 525/444 |
| 2016/0347920 A1* | 12/2016 | Inoue | ............... | C08J 5/18 |

FOREIGN PATENT DOCUMENTS

| | | |
|---|---|---|
| JP | 2009-160921 A | 7/2009 |
| WO | WO 2009/075333 A1 | 6/2009 |
| WO | WO 2011/125435 A1 | 10/2011 |

* cited by examiner

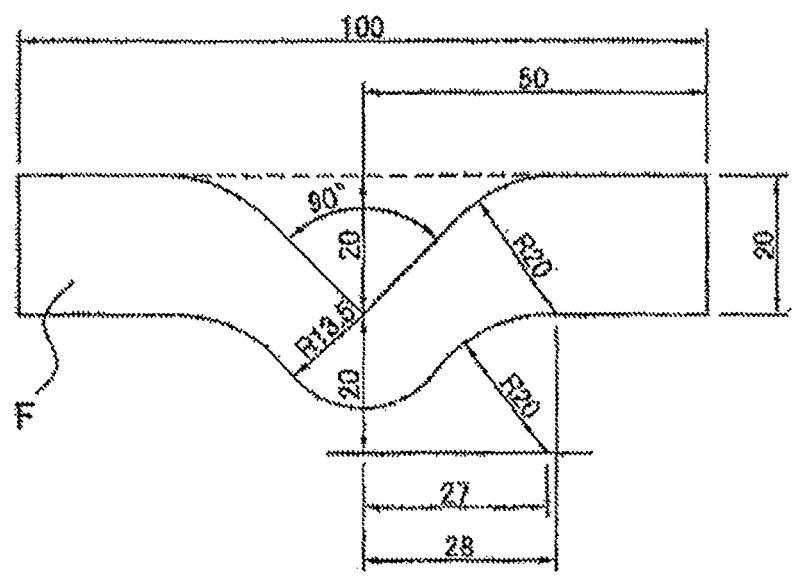

HEAT-SHRINKABLE POLYESTER FILM

CROSS-REFERENCE TO RELATED APPLICATIONS

This patent application is the U.S. national phase of International Patent Application No. PCT/JP2013/072971, filed Aug. 28, 2013, which claims benefit of Japanese Patent Application No. 2012-188508, filed on Aug. 29, 2012, which are incorporated by reference in their entireties herein.

Technical field

The present invention relates to a heat-shrinkable polyester film, and particularly to a heat-shrinkable polyester film which is suitable for use in a jacket label of a battery or similar applications and has a good tensile rupture elongation after aging, and a process for producing the same.

Background art

In recent years, the heat-shrinkable polyester film has become widely utilized for label package, etc. of PET bottles, glass containers and the like for the purposes of improving the outward appearances thereof, protecting the contents thereof and indicating the merchandise therein. The heat-shrinkable polyester film needs to have a large transversely shrinkable property; thus, its production, in many instances, involves stretching which may be conducted in a mainly transverse limited direction (Patent Document 1).

Recently, a heat-shrinkable polyester film having a thermosensitive adhesive laminated thereon has been used for the jacket of a battery. When such a heat-shrinkable polyester film on which a thermosensitive adhesive is laminated is attached to the outside of the battery, the process to be adopted typically includes: winding the film around the outside of the battery by making use of a drum heated at approximately 70° C. to 110° C. (barrel wrapping); then, fusing the thermosensitive adhesive at its overlapped portion (to heat seal that portion), so that the film is loosely wound around the outside of the battery; thereafter heating the battery to approximately 140° C. to cause the film to heat shrink, thereby making the film tightly wrapped around the outside of the battery. However, the film stretched only in the width direction as disclosed in Patent Document 1 has a shrinkage ratio and a thermal shrinkage stress too high in the low temperature range spanning approximately 60° C.-80° C. to disadvantageously cause the film to shrink while winding the film around the battery by making use of a heated drum, thus resulting in a poor finish of shrinkage in the final state of the heat shrunk film.

Moreover, when a label is attached to a cylindrical member such as a battery, the label should be made into an annular form, attached to the cylindrical member and then caused to heat shrink in its circumferential direction. Accordingly, if the heat-shrinkable film heat shrinkable in the width direction is used as such a label, the film should be made into an annularly-shaped member such that the width direction of the film is aligned with its circumferential direction, and then the annularly-shaped member should be cut into segments having a predetermined length and each segment should be attached to the cylindrical member. Therefore, such a label composed of a heat-shrinkable film heat shrinkable in the width direction is difficult to attach to the cylindrical member at high speed. For that reason, recently, there is a need to provide a film which is heat shrinkable in a longitudinal, direction and thus can be supplied from a film roll directly and attached to the peripheral surface of the cylindrical member (i.e., wrapped around the barrel), and the film stretched only in the width direction as disclosed in Patent Document 1 cannot fulfill this need.

In addition, the film stretched only in the width direction as disclosed in Patent Document 1 is low in mechanical strength in the longitudinal direction, and is disadvantageously liable to rupture while it is treated.

There has been proposed a heat-shrinkable polyester film, which overcomes the problems associated with the heat-shrinkable polyester film described in Patent Document 1, exhibiting a high shrinkability in a high-temperature range (approximately 130° C. to 150° C.) with a main shrinking direction oriented in a longitudinal direction thereof, though not shrinking in the longitudinal direction in a low-temperature range (approximately 60° C. to 80° C.), possessing an extremely high mechanical strength in the main shrinking direction and the width direction, thus hardly to rupture while it is treated, and can be utilized suitably as a film, for forming a jacket label of a battery and similar applications (see Patent Document 2).

The film described in Patent Document 2 is a film in which the problems of the film described in Patent Document 1 are improved. However, the film described in Patent Document 2 is made of a polyester resin having ethylene terephthalate as a major constituent and containing at least one monomer component capable of forming an amorphous component with a monomer component content in a glycol component being not less than 1 mol % and not more than 12 mol % (hereinafter, referred to as an amorphous PET material).

Since the film described in Patent Document 2 is prepared using an amorphous PET material, the tensile rupture elongation in a width direction that is a direction orthogonal to the main shrinking direction may decrease to less than 25% when the film is aged at a high temperature for a long period of time, for example at 60° C. for 672 hours, in consideration of storage in, for example, a warehouse etc. in the summer time. Therefore, the film described in Patent Document 2 is not preferred. Similarly, when the film is aged at 60° C. for 672 hours in consideration of storage in a warehouse etc. in the summer time, films block one another, so that when the film is printed in the form of a film product roll, peeling and charging occurs to generate static electricity. Since a solvent is often used in a printing process, generation of static electricity is not preferred because dusts and contaminants are easily deposited.

PRIOR ART DOCUMENTS

Patent Documents

Patent Document 1: JP-A No. Hei. 9-239833
Patent Document 2: JP-A No. 2009-160921

SUMMARY OF THE INVENTION

Problems to be Solved by the Invention

It is an object of the present invention to provide a heat-shrinkable polyester film, which overcomes the problems associated with the heat-shrinkable polyester films in Patent Documents 1 and 2, possessing a high mechanical strength in a width direction orthogonal to the main shrinking direction, possessing a high tensile rupture elongation in the film, width direction after being subjected to an aging treatment in a high-temperature environment for a long period of time, for example at 60° C. for 672 hours, and hardly generating static electricity at the time of printing and processing a product roll subjected to an aging treatment in a high-temperature environment for a long period of time, for example at 60° C. for 672 hours, and can be produced from only homo PET substantially without using an amorphous PET material.

Means for Solving the Problems

That is, the present invention is configured as follows.

1. A heat-shrinkable polyester film which is made of a polyester resin having ethylene terephthalate as a major constituent and containing a monomer component capable of forming an amorphous component with a monomer component content of not less than 0 mol % and less than 1 mol % relative to all polyester resin components, and satisfies the following requirements (1) to (4):

(1) the film has a heat shrinkage of not less than −1% and not more than 5% in a longitudinal direction when treated for 5 minutes in a hot air oven at 90° C.;

(2) the film has a heat shrinkage of not less than 15% and not more than 40% in a longitudinal direction when treated for 5 minutes in a hot air oven heated to 140° C.;

(3) the film has a heat shrinkage of not less than −5% and not more than 5% in a width direction when treated for 5 minutes in a hot air oven heated to 140° C.; and (4) the film has a rupture elongation of not less than 25% and not more than 80% in a film width direction after being aged for 672 hours in a thermo-hygrostat set at 60° C.

2. The heat-shrinkable polyester film described in the first, wherein the film has a tensile rupture strength of not less than 200 MPa and not more than 400 MPa in the width direction.

3. The heat-shrinkable polyester film described in the first or second, wherein the film has a refractive index of not less than 1.62 and not more than 1.66 in the width direction.

4. The heat-shrinkable polyester film according to any one of the first to third, wherein the film has a haze of not less than 2% and not more than 12%.

5. The heat-shrinkable polyester film according to any one of the first to fourth, wherein the film has a dynamic friction coefficient of not less than 0.1 and not more than 0.7 between one surface of the film and a back surface thereof.

6. The heat-shrinkable polyester film, according to any one of the first to fifth, wherein the film has a static electricity of 5 kV or less at the time when a product roll is wound off at a speed of 200 m/min after being aged for 672 hours in an environmental test chamber set at 60° C.

Effects of the Invention

The heat-shrinkable polyester film according to the present invention exhibits a high shrinkability in a high-temperature range (130° C.-150° C.) with a main shrinking direction oriented in a longitudinal direction thereof, though not shrinking in the longitudinal direction in a low-temperature range (90° C. or less, for example, 60° C.-80° C.), possesses an extremely high mechanical strength in the main shrinking direction and the width direction, is thus unlikely to rupture while it is treated. Therefore, it can be utilized suitably as a film for forming a jacket label of a battery or similar applications, can be wound around a battery very efficiently within a short period of time, and can exhibit a good finish, when the thus-wound film is heat shrunk, such that wrinkles resulting from heat shrinkage and insufficiently shrunk portions are considerably reduced.

The tensile rupture elongation in the width direction that is a direction orthogonal to the main shrinking direction after aging at 60° C. for 672 hours is 25% or more, and therefore even when a film is stored in a warehouse etc, having a high room temperature in the summer time etc., the risk of breakage of a bag after attaching is low even though a film stored at a high temperature is used because the tensile rupture elongation in the film width direction is high. Since static electricity is hardly generated in a printing process etc., foreign matters such as dusts and contaminants are hard to be deposited.

BRIEF DESCRIPTION OF THE DRAWINGS

FIG. 1 is an explanatory view showing a shape of a test piece in measurement of a rectangular tear strength (the unit of the length of each part of the test piece in the figure is mm, and R represents a radius).

MODE FOR CARRYING OUT THE INVENTION

Examples of the preferred production process for continuously producing the heat-shrinkable polyester film according to the above-mentioned first to sixth aspects may include the following production process. That is, an unstretched film, of which both edges facing in the width directions are held by clips in a tenter, is stretched in the lateral direction at a ratio of not less than 3.5 and not more than 6.0 at a temperature not less than Tg+5° C. and not more than Tg+40° C.; the film, is then stretched in the longitudinal direction at a ratio of not less than 1.5 and not more than 2.5 at a temperature of not less than Tg+5° C. and not more than Tg+40° C. using a heated rolls having a speed difference; and thereafter the film, of which both edges are held by clips, is relaxed in the lateral direction at a ratio of not less than 0% and not more than 15% while being heat-treated at a temperature of not less than Tg+35° C. and not more than Tg+70° C.

Preferably, the film of the present invention is made of polyethylene terephthalate. Here, the polyethylene terephthalate is a polymer composed mainly of an ethylene terephthalate unit containing ethylene glycol and terephthalic acid as major constituents. By using polyethylene terephthalate, an excellent mechanical strength and transparency as a protective film can be achieved.

The polyethylene terephthalate (hereinafter, referred to simply as PET) is preferably a polyester made only of an ethylene terephthalate unit, but a constituent unit composed of terephthalic acid and diethylene glycol, which is not positively involved in copolymerization and is contained as a by-product in an amount of less than 1 mol %, may exist in the ethylene terephthalate unit.

In the present invention, a typical example of a monomer capable of forming an amorphous component which forms an amorphous PET material that is not usually used is the above-mentioned diethylene glycol, but examples of the monomer may also include neopentyl glycol, 1,4-cyclohexanedimethanol, isophthalic acid,1,4-cyclohexanedicarboxylic acid, 2,6-naphthalenedicarboxylic acid, 2,2-diethyl-1,3-propanediol, 2-n-butyl-2-ethyl-3-propanediol, 2,2-isopropyl-1,3-propanediol, 2,2-di-n-butyl-1,3-propanediol and hexanediol, and it is preferred that the monomer is limited to less than 1 mol % in all dicarboxylic acid components or all diol components.

The intrinsic viscosity of polyethylene terephthalate is preferably in a range of 0.60 to 0.75. An intrinsic viscosity of less than 0.60 is not preferred because the tear resistance improvement effect is reduced, and an intrinsic viscosity of greater than 0.75 is not preferred because a rise in filtration pressure increases, so that high-precision filtration becomes difficult.

The heat-shrinkable polyester film of the present invention, when it is treated for 5 minutes under no-load condition in hot air at 90° C., heat shrinkage in the longitudinal direction of the film calculated from the following Equation 1 (namely, heat shrinkage at 90° C.) is preferable to be −1 or more and 5% or less from the lengths before and after shrinkage.

Heat shrinkage={(length before shrinkage−length after shrinkage)/length before shrinkage}×100 (%)      Equation 1

The heat shrinkage in the longitudinal direction at 90° C. being below −1% would undesirably make the label loose on the heated drum for activating the thermosensitive adhesive, and thus the label could not be neatly wound around the battery with the result that the finish of the heat shrunk label after shrinkage would disadvantageously become poor. On the other hand, the hot-water heat shrinkage in the longitudinal direction at 90° C. being more than 5% would undesirably make the label shrink on the heated drum for activating the thermosensitive adhesive, and thus the label could not be neatly wound around the battery at a disadvantage. The upper limit value of the heat shrinkage in the longitudinal direction at 90° C. may be preferably equal to or less than 4%, and more preferably equal to or less than 3%.

The heat-shrinkable polyester film of the present invention, when it is treated for 5 minutes under no-load condition in hot air at 140° C., heat shrinkage in the longitudinal direction of the film calculated from the above Equation 1 (namely, heat shrinkage at 140° C.) is preferable to be 15% or more and 40% or less from the lengths before and after shrinkage.

The heat shrinkage in the longitudinal direction at 140° C. being below 1.5% would disadvantageously make an amount of shrinkage so small that undesirable wrinkles and/or slack would appear in the label after heat shrunk; on the other hand, the heat shrinkage in the longitudinal, direction at 140° C. being above 40% would make the label in use likely to have undesirable distortion created upon thermal shrinkage when the film is used as a label (shrinkage-derived distortion). The lower limit value of the heat shrinkage in the longitudinal direction at 140° C. may be preferably equal to or more than 17%, more preferably equal to or more than 19%, and particularly preferably equal to or more than 21%. The upper limit value of the heat shrinkage in the longitudinal direction at 140° C. may be preferably equal to or less than 38%, more preferably equal to or less than 36%, and particularly preferably equal to or less than 34%.

The heat-shrinkable polyester film of the present invention, when it is treated for 5 minutes under no-load condition in hot air at 140° C., heat shrinkage in the width direction (the direction orthogonal to the longitudinal direction) of the film calculated from the above Equation 1 (namely, heat shrinkage in the width direction at 140° C.) is preferable to be −5% or more and 5% or less from the lengths before and after shrinkage.

The heat shrinkage in the width direction at 140° C. being less than −5% (e.g., −10%) disadvantageously could not provide a good shrunk appearance when the film is used as the label of a battery. On the other hand, the glycerin immersion heat shrinkage in the width direction at 140° C. being more than 5% would make the label in use likely to have undesirable distortion created upon heat shrinkage when the film is used as a label (shrinkage-derived distortion). The lower limit value of the heat shrinkage in the width direction at 140° C. may be preferably equal to or more than −4%, more preferably equal to or more than −3%, and particularly preferably equal to or more than −2%. The upper limit value of the heat shrinkage in the width direction at 140° C. may be preferably equal to or less than 4%, more preferably equal to or less than 3%, and particularly preferably equal to or less than 2%.

Preferably, the heat-shrinkable polyester film of the present invention has a tensile rupture elongation of not less than 25% and not more than 80% in the film width direction after the film is aged in an atmosphere of 60° C., 65% RH for 672 hours. A tensile rupture elongation of less than 25% in the film width direction after aging is not preferred because cracking easily occurs when the film stored in a warehouse in the summer time etc. is used as a label of a battery. The lower limit value of the tensile rupture elongation in the width direction after aging at 60° C. for 672 hours is preferably 27% or more, more preferably 29% or more, particularly preferably 31% or more. The upper limit value of the tensile rupture elongation in the width direction after aging at 60° C. for 672 hours is preferably high, and may be higher than 80%, but it is thought that an upper limit adjustable under the present circumstances is approximately 80%.

Preferably, the heat-shrinkable polyester film of the present invention has a tensile rupture strength of not less than 200 MPa and not more than 400 MPa in the film width direction. The width direction is a direction orthogonal to the main shrinking direction, and a tensile rupture strength of less than 200 MPa in the width direction is not preferred because so called stiffness is reduced, so that wrinkles etc. are easily generated when the film is used as a label of a battery. The lower limit value of the tensile rupture strength in the width direction is preferably 220 MPa or more, more preferably 240 MPa or more, particularly preferably 260 MPa or more. The upper limit value of the tensile rupture strength in the width direction is preferably high, and may be higher than 400 MPa, but currently it is thought that an upper limit which can be adjusted is approximately 400 MPa.

Preferably, the heat-shrinkable polyester film of the present invention has a refractive index of not less than 1.62 and not more than 1.66 in the film width direction. A refractive index of less than 1.62 is not preferred because the shrinkage in the width direction increases, and the mechanical strength in the width direction decreases. The lower limit value of the refractive index in the film width direction is preferably 1.625 or more, more preferably 1.63 or more. A refractive index of more than 1.66 in the width direction is preferred because the mechanical strength in the width direction increases and the shrinkage in the width direction decreases, but an upper limit adjustable under the present circumstances is approximately 1.66.

Preferably, the heat-shrinkable polyester film of the present invention has a refractive index of not less than 1.59 and not more than 1.64 in the film longitudinal direction. A refractive index of less than 1.59 is not preferred because the shrinkage in the longitudinal direction at 90° C. increases. The lower limit value of the refractive index in the film longitudinal direction is preferably 1.595 or more, more preferably 1.6 or more. A refractive index of more than 1.64 in the longitudinal direction is not preferred because the shrinkage at 140° C. decreases. The upper limit value of the refractive index in the longitudinal direction is preferably 1.635 or less, and more preferably 1.63 or less.

In addition, the heat-shrinkable polyester film of the present invention may preferably be configured such that thickness unevenness in the longitudinal direction are within a range not more than 15%. The thickness unevenness beyond 15% would disadvantageously make printing unevenness likely to show up in the printing step in the process of label production, and make shrinkage unevenness likely to show up after heat shrinkage. The thickness unevenness in the longitudinal direction may be preferably within a range not more than 13%, and more preferably within a range not more than 11%. The thickness unevenness in the longitudinal direction may be preferably 0%, but the lower limit may be approximately 2% for practical use.

The thickness of the heat-shrinkable polyester film of the present invention is not particularly limited; however, the thickness of the heat-shrinkable polyester film for forming a label may be preferably in the range of 10 to 100 μm, and more preferably in the range of 15 to 95 μm.

Further, in the heat-shrinkable polyester film of the present invention, when right-angled tearing strength per unit thickness in the width direction after being shrunk by 10% in the width direction in hot air at 140° C. is obtained by the following method, the right-angled tearing strength per unit thickness in the width direction is preferable 100 N/mm or more and 300 N/mm or less.

[Measuring Method of Right-Angled Tearing Strength]

After the film is shrunk by 10% in the longitudinal direction in hot air oven adjusted at 140° C., it is sampled as a specimen with a predetermined size in accordance with JIS-K-7128. Thereafter, a tensile test was conducted at a tensile speed of 200 mm/minute with both ends of the test piece caught in a universal tensile tester, and a maximum load at which the film was completely torn in the longitudinal direction was measured. The maximum load was divided by a thickness of the film to calculate a right-angled tearing strength per unit thickness.

When the right-angled tearing strength after being shrunk by 10% in the width direction in hot air at 140° C. is less than 100 N/mm, a situation in which the film is easily torn by an impact such as falling during transportation is possibly caused when the film is used as a label, whereby the case is unpreferred, conversely, when the right-angled tearing strength is more than 300 N/mm, it is not preferable because cutting property (easiness of tearing) become had at an early stage of tearing a label. The lower limit value of the right-angled tearing strength is more preferably 125 N/mm or more, furthermore preferably 150 N/mm or more, particularly preferably 1 N/mm or more. Further, the upper limit value of the right-angled tearing strength is more preferably 275 N/mm or less, furthermore preferably 250 N/mm or less, particularly preferably 225 N/mm or less.

Preferably, the heat-shrinkable polyester film of the present invention has a haze of not less than 2% and not more than 12%. The haze of the film is preferably low, but the lower limit value thereof is 2% from a practical point of view because a lubricant may be added for reducing the friction coefficient. On the other hand, a haze of more than 12% is not preferred because the transparency is impaired. The upper limit value of the haze is preferably 11% or less, more preferably 10% or less, particularly preferably 9% or less.

Preferably, the heat-shrinkable polyester film of the present invention has a dynamic friction coefficient of not less than 0.1 and not more than 0.7 between one surface and the other surface, i.e. a back surface thereof. The dynamic friction coefficients preferably low because peeling and charging hardly occurs, but a dynamic friction coefficient of less than 0.1 is not preferred because winding deviation easily occurs at the time of winding the film during processing. The lower limit value of the dynamic friction coefficient is preferably 0.11 or more, more preferably 0.12 or more, particularly preferably 0.13 or more. On the other hand, a dynamic friction coefficient of more than 0.7 is not preferred because blocking easily occurs. The upper limit value of the dynamic friction coefficient is preferably 0.68 or less, more preferably 0.66 or less, particularly preferably 0.64 or less.

Preferably, the heat-shrinkable polyester film of the present invention has a static electricity of 5 kV or less at the time when a product roll is wound off at a speed of 200 m/min after being aged for 672 hours in an environmental test chamber set at 60° C. Since a solvent is used in a printing process, and when the static electricity is high, contaminants and dusts are deposited on the film, the static electricity is preferably low. The upper limit value of the static electricity is preferably 4.5 kV or less, more preferably 4.0 kV or less, particularly preferably 3.5 kV or less. The static electricity is preferably as low as possible, but polyester essentially easily causes static electricity, and the lower limit thereof is approximately 0.5 kV, and may be approximately 1.0 kV.

While the heat-shrinkable polyester film of the present invention is not limited in terms of a method for production thereof, it may be obtained by melting and extruding a polyester material (PET) described above by an extruder to form an unstretched film, and subjecting the unstretched film to biaxial stretching and heat treatment by a method as will be described later.

When a raw material resin is molten and extruded, the polyester material may preferably be dried using a dryer such as a hopper dryer, a paddle dryer or a vacuum dryer. The polyester material which has been dried in this way is thereafter put through the extruder in which it is molten at a temperature between 200° C. and 300° C. and extruded into a sheet-like form. In this extruding step, any existing methods including the T-die method, the tubular method, etc. may be adopted.

A sheet of molten resin obtained after extrusion is then rapidly cooled; thereby, an unstretched film can be obtained. As a method for rapidly cooling the molten resin, a method for obtaining a substantially unoriented resin sheet by casting the molten resin through a nozzle onto a rotating drum to rapidly cool and solidify the resin can preferably be adopted.

Further, the thus-obtained unstretched film is, as will be described later, stretched in the lateral direction under predetermined conditions, thereafter preliminarily subjected to heat treatment (may or may be not subjected to the above-mentioned heat treatment), then stretched in the longitudinal direction under predetermined conditions, and heat-treated under relaxation, so that the heat-shrinkable polyester film of the present invention can be obtained. Hereinafter, a detailed description will be given of a preferred biaxial stretching and heat treatment method for obtaining a heat-shrinkable polyester film of the present invention, with consideration given to the difference from the biaxial stretching and heat treatment method for a conventional heat-shrinkable polyester film.

[Preferred Sequentially Biaxially Stretching Method]

A conventional heat-shrinkable polyester film is produced by stretching an unstretched film in a direction in which one intends to cause the film to shrink. Although the heat-shrinkable polyester film which shrinks in the longitudinal, direction has hitherto been in large demand, the method of doing nothing but simply stretching an unstretched film in the longitudinal direction is underproductive in that a, film of great width cannot be produced. JP 1-127317 A discloses a film shrinkable in the longitudinal direction, but the film is not stretched in the lateral direction, and therefore has a low mechanical strength in the width direction and a high right-angled, tearing strength, so that the film is unsatisfactory for use as a jacket label of a battery. Further, the film has large thickness unevenness in the longitudinal direction.

[Relationship Between Stretch Ratio and Shrinkage]

The present inventors have conducted studies to achieve a rupture elongation of 25% or more in the non-shrinking direction of a film after aging at 60° C. for 672 hours, and resultantly found that an amorphous PET material should not be used for the film. Heretofore, however, it has been common knowledge that for the heat-shrinkable film, an amorphous PET material is used, and stretching is performed at a high ratio in a direction for the film to shrink, so that the molecular chain is oriented to shrink the film. However, as a result of conducting the studies, the present inventors have found that even when an amorphous material is not used, and only a substantial homo PET is used, the film can be caused to heat shrink by setting the stretch ratio to about 2. It has been found that in the case where only the crystalline homo PET is used, the shrinkage in the stretching direction decreases when the stretch ratio is increased to more than approximately 3.

[Stretch Ratio in Lateral Direction]

In view of the above mentioned results of studies, it is preferred that the film is stretched at a stretch ratio of not less than 3.5 and not more than 6 at a temperature of not less than Tg+5° C. and not more than Tg+40° C. during initial lateral stretching for biaxially stretching the film and causing the film to shrink with the longitudinal direction as a main shrinking direction. A stretch ratio of less than 3.5 is not preferred because the shrinkage in the width direction is not necessarily sufficiently reduced. The upper limit of the lateral stretch ratio is not particularly limited, but a lateral stretch ratio of more than 6 is not preferred because the film is hard to be stretched in the longitudinal direction (the film is easily ruptured). The lateral stretch ratio is more preferably not less than 3.7 and not more than 5.8, further preferably not less than 3.9 and not more than 5.6. Thus, the relationship between the lateral stretch ratio and the shrinkage in the width direction in a film for which an amorphous PET material is not used is as described above, and therefore a heat treatment after stretching in the lateral direction as shown in Patent Document 2 may, or may not be performed.

A stretching temperature of less than Tg+5° C. in the lateral direction is not preferred because the film is easily ruptured when stretched. A stretching temperature of more than Tg+40° C. is not so preferred because the tensile rupture strength in the width direction may decrease. The stretching temperature is more preferably not less than Tg+8° C. and not more than Tg+37° C., further preferably not less than Tg+11° C. and not more than Tg+34° C.

[Stretch Ratio in Longitudinal Direction]

Preferably, the film is stretched at a stretch ratio of not less than 1.5 and not more than 2.5 at a temperature of not less than Tg+5° C. and not more than Tg+40° C. during longitudinal stretching after lateral stretching. A stretch ratio of less than 1.5 is not preferred because the shrinkage is insufficient, and a stretch ratio of more than 2.5 is not preferred as a film uniaxially shrinkable in the longitudinal direction because the shrinkage in the width direction increases. The stretch ratio is more preferably not less than 1.6 and not more than 2.4, further preferably not less than 1.8 and not more than 2.3.

A stretching temperature of less than Tg+5° C. in the longitudinal direction is not preferred because the film is easily ruptured when stretched. A stretching temperature of more than Tg+40° C. is not preferred because heat crystallization of the film proceeds to reduce the shrinkage. The stretching temperature is more preferably not less than Tg+8° C. and not more than Tg+37° C., further preferably not less than Tg+11° C. and not more than Tg+34° C.

[Heat Treatment and Relaxation in Lateral Direction]

Preferably, the film is relaxed in the lateral direction at a ratio of not less than 0% and not more than 15% while being heat-treated at a temperature of not less than Tg +35° C. and not more than Tg+100° C. with film both ends held by clips after longitudinal stretching. A heat treatment temperature of less than Tg+35° C. is not preferred because the shrinkage in the longitudinal direction at 90° C. increases. A heat treatment temperature of more than Tg+100° C. is not preferred because heat crystallization of the film proceeds to reduce the shrinkage ratio in the longitudinal direction at 140° C. The heat treatment temperature is more preferably not less than Tg+38° C. and not more than Tg+97° C., further preferably not less than Tg+41° C. and not more than Tg+94° C. A relaxation ratio of less than 0% in the lateral direction is not preferred because the film is stretched substantially in the lateral direction. The relaxation ratio may be higher than 15%, but a high relaxation is not preferred because the width of a film as a final product decreases. The relaxation ratio is more preferably not less than 1% and not more than 14%, further preferably not less than 2% and not more than 13%.

As described above, an example of the preferred stretching method in the present invention is one in which the stretch ratio in the longitudinal direction is made smaller than the stretch ratio in the lateral direction. In many of conventional heat-shrinkable polyester films prepared using an amorphous PET material, it is often the case that a high stretch ratio is employed, in each of the longitudinal direction and the lateral direction, and a direction corresponding to a higher refractive index is a main shrinking direction, but the same does not necessarily apply to the present invention. This may relate to the nature of crystalline PET which does not contain a large amount of a monomer component capable of forming an amorphous component in the present invention. That is, for crystalline PET, it is conceivable that for example when the film is stretched at a high stretch ratio of 3.5 or more in the lateral direction, the molecular chain is oriented and crystallization of the molecular chain proceeds, and this acts as a factor of reducing the heat shrinkage in the width direction. In this respect, it is assumed that a stretch ratio of approximately 1.5 to 2.5 in the longitudinal direction is in a range where crystallization does not significantly proceed even when the molecular chain is oriented to some extent in the longitudinal direction, and therefore a relatively high heat shrinkage is achieved. In the present invention, it is difficult to simply express a relationship between the orientation of the molecular chain and the crystallization degree, and therefore the relationship is expressed by heat shrinkage and refractive indexes in the longitudinal direction and the width direction and a magnitude correlation thereof as a substitute measure of the structure of the molecular chain. Of course, it is thought that the relaxation heat treatment in the lateral direction contributed to a certain degree in reduction of the heat shrinkage in the width direction.

EXAMPLES

The present invention will hereinbelow be demonstrated in detail by examples, but it is appreciated that the present invention is not limited to specific embodiments as will be demonstrated in the examples, and modifications can be made thereto where appropriate, without departing the gist of the present invention. The properties and compositions of the materials used in the examples and comparative examples, and the film production conditions (the conditions for stretching and heat treatment, etc.) of the examples and comparative examples are shown in TABLE 1 and TABLE 2.

TABLE 1

| | Raw material composition of polyester (mol %) | | | Added amount of lubricant (ppm) |
|---|---|---|---|---|
| | Dicarboxylic acid component | Polyhydric alcohol component | | |
| | DMT | EG | NPG | |
| Polyester 1 | 100 | 100 | 0 | 0 |
| Polyester 2 | 100 | 100 | 0 | 8000 |
| Polyester 3 | 100 | 70 | 30 | 0 |

TABLE 2

| | Resin composition | Amount of NPG (mol %) | Glass transition temperature (° C.) |
|---|---|---|---|
| Example 1 | Polyester1:polyester2 = 93:7 | 0 | 75 |
| Example 2 | Polyester1:polyester2 = 93:7 | 0 | 75 |
| Example 3 | Polyester1:polyester2 = 93:7 | 0 | 75 |
| Example 4 | Polyester1:polyester2 = 93:7 | 0 | 75 |
| Example 5 | Polyester1:polyester2 = 93:7 | 0 | 75 |
| Example 6 | Polyester1:polyester2 = 93:7 | 0 | 75 |
| Comparative Example 1 | Polyester1:polyester2 = 93:7 | 0 | 75 |
| Comparative Example 2 | Polyester1:polyester2 = 93:7 | 0 | 75 |
| Comparative Example 3 | Polyester1:polyester2:polyester3 = 68:7:25 | 7.5 | 75 |
| Comparative Example 4 | Polyester1:polyester2:polyester3 = 86:7:7 | 2.1 | 75 |

| | Lateral stretching step | | Longitudinal stretching step | | Heat treatment step | |
|---|---|---|---|---|---|---|
| | Stretching temperature (° C.) | Stretch ratio | Stretching temperature (° C.) | Stretch ratio | Temperature (° C.) | Relaxation ratio (%) |
| Example 1 | 85 | 4 | 95 | 2 | 140 | 0 |
| Example 2 | 85 | 4.1 | 95 | 2 | 140 | 2.5 |
| Example 3 | 85 | 4 | 95 | 2.5 | 140 | 5 |
| Example 4 | 85 | 4.5 | 95 | 1.5 | 140 | 0 |
| Example 5 | 85 | 4 | 95 | 2 | 160 | 0 |
| Example 6 | 85 | 3.5 | 95 | 2 | 140 | 10 |
| Comparative Example 1 | No lateral stretching | | 85 | 2 | 140 | 0 |
| Comparative Example 2 | 85 | 4 | 95 | 2 | 110 | 0 |
| Comparative Example 3 | 85 | 4 | 95 | 2 | 140 | 0 |
| Comparative Example 4 | 85 | 3.3 | 105 | 2 | 125 | 5 |

The method of evaluation of each film is as follows.

[Heat Shrinkage]

A dimensional variation ratio (%) in each of the longitudinal direction and the width direction is measured in accordance with JIS C 2318-1997 5.3.4 (Dimensional Change) using a hot air oven at a predetermined temperature of 90±0.5° C. and 140±0.5° C., and a heat shrinkage was determined from the above equation 1.

[Intrinsic Viscosity (IV)]

Dissolved was 0.2 g of polyester in 50 nil of a mixed solvent of phenol/1,1,2,2-tetrachloroethane (60/40 (weight ratio)), and an intrinsic viscosity was measured at 30° C. using an Ostwald viscometer. The unit is dl/g.

[Refractive Index]

Each sample film was left for two-hour or longer period of time in an atmosphere of 23° C., 65% RH, and thereafter put through "Abbe Refractometer Model 4T" manufactured by Atago Co., Ltd. for measurement.

[Right-Angled Tearing Strength]

After a film was shrunk by 10 in the main shrinkage direction in hot water adjusted at 140° C., in accordance with JIS-K-71.28, a specimen was produced by sampling in a shape shown in FIG. 1 (additionally, in sampling, longitudinal direction of the specimen was defined as the main shrinkage direction). Thereafter, a tensile test was conducted at a tensile speed of 200 mm/minute with both ends of the test piece caught in a universal tensile tester (manufactured by SHIMADZU CORPORATION, AUTOGRAPH (registered trademark)), and a maximum load at which the film was completely torn in the longitudinal direction was measured. The maximum load was divided, by a thickness of the film, to calculate a right-angled tearing strength per unit thickness.

[Method for Measuring Tensile Rupture Strength and Tensile Rupture Elongation]

In accordance with JIS-K-7127, a specimen was formed by sampling a film in the form of a rectangle that was 50 mm long in a direction orthogonal to the main, shrinkage direction (film width direction) and 20 mm long in the main shrinkage direction (film long direction), a tensile test was conducted at a tensile speed of 200 mm/minute with both ends (both ends in the longitudinal direction) of the specimen held using a universal tensile tester (AUTOGRAPH (registered trademark) manufactured by Shimadzu Corporation), and a stress value at the time of rupture was calculated as a tensile rupture strength. An elongation at the time of rupture was defined as a rupture elongation.

[Aging Treatment (1): Treatment by Thermo-Hygrostat Before Measurement of Rupture Elongation in Width Direction]

The inside of a thermo-hygrostat <manufacturer: YAMATO SCIENTIFIC CO., LTD.; model: IG43M> was brought to an environment with a temperature of 60° C. and a humidity of 65%, and under this environment, a film sampled to the A4 size was subjected to an aging treatment while being left standing for 672 hours.

[Aging Treatment (2): Treatment in Environmental Test Chamber Before Measurement of Static Electricity]

The inside of an environmental test chamber was brought to an environment with a temperature of 60° C. and a humidity of 65%, and under this environment, a product roll having a winding length of 1000 in was subjected to an aging treatment while being left standing for 672 hours.

[Haze]

In accordance with JIS-K-7136, a haze was measured using a haze meter (300A manufactured by NIPPON DENSHOKU INDUSTRIES Co., LTD). Measurement was performed twice, and an average value thereof was determined.

[Dynamic Friction Coefficient]

In accordance with JIS-K-7125, dynamic friction coefficient td was obtained when the front surface and the rear surface of the film were contacted under an atmosphere at 23° C., and 65% RH using a tensile tester (Tensilon manufactured by ORIENTEC Co., Ltd.). The weight of a thread (weight) in which the upper side film was wound was 1.5 kg, and the base area of the thread was 63 mm lengthwise×63 mm transverse. Further, the tensile speed in the measurement of friction was 200 min/min.

[Static Electricity]

The product roll subjected to the aging treatment was placed in a secondary SL (model: KE70) manufactured by KATAOKA MACHINE TOOLS MFG. Co., Ltd., and a static electricity was measured by a digital electrostatic potential measurement device (model: KSD-1000) manufactured by KASUGA ELECTRIC WORK LTD.), while the film was wound at a winding speed of 200 m/min.

[Tg (Glass Transition Point)]

Using a differential scanning calorimeter manufactured by Seiko Instruments Inc. (model: DSC220), 5 mg of an undrawn film was heated at a heating-up speed of 10° C./min from −40° C. to 120° C., Tg was obtained from the thus obtained endothermic curve. Tangent lines were drawn in front of and behind, the inflection point of the endothermic curve, and the intersection was defined as Tg (glass transition point).

[Thickness Unevenness in Longitudinal Direction]

A film in the longitudinal direction was sampled in the form of a long roll having a length of 30 m×a width of 40 mm, and a thickness unevenness in the longitudinal direction was measured at a speed of 5 (m/minute) using a continuous contact type thickness meter manufactured by Micron Sokuteiki KK. In sampling of the film sample in the form of roll, the longitudinal direction of the film sample was a main shrinkage direction of the film. At measurement, the maximum thickness, the minimum thickness and the average thickness were defined as Tmax., Tmin. and Tave., respectively, and the irregularity of thickness of the film in the longitudinal direction was calculated from the following Equation 2.

$$\text{Irregularity of thickness} = \{(T\text{max.} - T\text{min.})/T\text{ave.}\} \times 100(\%) \quad \text{Equation 2}$$

[Shrinkage Finish Property]

The heat-shrinkable film as thus obtained was trimmed into a size of length 105 mm×width 40 mm in such a manner that the length orients in the longitudinal direction of the film. A double-faced tape was then adhered to an outer peripheral surface at an upper end of R20 battery, and the film as thus trimmed was wound around the battery on the outer face of the double-faced tape in such a manner as shown in FIG. 1 that one of the longer sides of the film extends 3 mm beyond the edge of the battery. Hot air at 200° C. (at a speed of 10 m/second) was applied continuously for 10 seconds to the battery having the film wound therearound, so that the film shrunk. Thereafter, the shrinkage finish property was visually checked, and rated on the two scales as follows.

Good: Almost no shrinkage loss/unevenness observed

Poor: Shrinkage loss or unevenness observed

[Perforation-Opening Property]

A label to which perforations were previously provided in the direction orthogonal to the main shrinkage direction was attached on a battery in the same condition as in the foregoing measuring condition of shrinkage finish property. The perforation was formed by providing a hole of 1 mm long in the intervals of 1 mm, and two lines of perforations were provided in width 22 mm in the width direction of the film. Thereafter, perforations of the label were torn with fingertips, and the number of label cleanly torn along the perforations in the width direction thereby to be able to remove the label from the batter as counted, and a ratio (%) relative to the total samples of 50 was calculated. The film having defective ratio of less than 10% was a passing.

[Content (mol %) of Amorphous Component Constituent Unit]

A sample solution was prepared by dissolving each sample in a solvent obtained by mixing chloroform D (manufactured by Uresop Company, and trifluoroacetic acid D1 (manufactured by Uresop Company) at a volume ratio of 10:1, and the NMR of a proton in the sample solution was measured under conditions of a temperature of 23° C. and an integration number of 32 using NMR ("GEMINI-200"; manufactured by Varian, Inc.). In NMR measurement, a peak intensity of a predetermined proton was calculated to measure an amount of a monomer that could form an amorphous component, such as diethylene glycol or neopentyl glycol, in 100 mol % of a polyhydric alcohol, or an amount of a monomer that could form an amorphous component, such as isophthalic acid, in 100 mol % of a dicarboxylic acid component, so that a content (mol %) of an amorphous component constituent unit in 100 mol % of all constituent units.

Polyester used in Examples and Comparative examples are as follows.

Polyester 1: polyethylene terephthalate (TV 0.75 dl/g)

Polyester 2: polyethylene terephthalate (IV 0.75 dl/g) with SiO2 (SILYSIA 266 manufactured by Fuji Silysia Chemical Ltd.) added as a lubricant at a ratio of 8,000 ppm to polyester in production of the polyester 2.

Polyester 3: polyester composed of 70 mol % of ethylene glycol, 30 mol % of neopentil glycol, and terephthalic acid (IV 0.72 dl/g)

Example 1

Each of the polyesters 1 to 3 has as a main constituent unit, a constituent unit composed on terephthalic acid and ethylene glycol, but also contains as a by-product a constituent unit composed of terephthalic acid and diethylene glycol at a ratio of approximately 0.4 mol % to all constituent units. Polyester 1 and polyester 2 specified above were mixed at a weight ratio of 93:7 and charged into an extruder. Thereafter, the mixed resin was molten at 280° C. extruded from T-die, wound around a rotating metal roll cooled at the surface temperature of 30° C. and thereby quenched, so that an unstretched film having a thickness of 240 μm was obtained. At this step, the take-up speed (rotation speed of the metal roll) of the unstretched film was approximately 20 m/minute, and Tg of the unstretched film was 75° C. Thereafter, the unstretched. was introduced into a tenter (first tenter) in which a lateral stretching zone, an intermediate zone and an intermediate heat treatment zone were provided continuously.

The unstretched film introduced into the tenter was preliminarily heated until the film temperature reached 90° C., then stretched 4 times in the lateral direction at 35° C. in the lateral stretching zone, and subjected therein to heat treatment at a temperature of 70° C. (the heat treatment does not necessarily apply), to thereby obtain a laterally stretched film having thickness of 60 μm.

The laterally stretched film was introduced into a longitudinal stretching machine having a plurality of rolls continuously arranged, in which the film was preliminarily heated on a preheat roll until the film temperature reached 80° C. and thereafter stretched 2.0 times between stretching rolls of which the surface temperature was set at 95° C. Thereafter, the longitudinally stretched film was forcedly cooled by a cooling roll of which the surface temperature was set at 25° C. The surface temperature of the film before cooling was approximately 85° C., and the surface temperature of the film after cooling was approximately 25° C. The time required for cooling from 70° C. to 25° C. was approximately 1.0 second, and the speed at which the film was cooled was 45° C./second.

Then, the film thus cooled was introduced into a tenter (second tenter). In the second tenter, the film was subjected to heat treatment in an atmosphere of 140° C. for 5.0 seconds with both edges thereof facing in the width directions being held by clips. The relaxation ratio at this time was 0%. Then cooled and cut to remove the both edges, whereby an approximately 30 μm-thick biaxially stretched film was formed continuously to a predetermined length and a film roll composed of a heat-shrinkable polyester film was obtained. The properties of the film thus obtained were evaluated by the method described above. The results of evaluation are shown in TABLE 3. An excellent film well balanced in shrinkage finish property, perforation-opening ratio, and a rupture elongation in the width direction after aging was obtained.

Example 2

A biaxially stretched film having a thickness of approximately 30 μm was obtained in the same manner as in Example 1 except that the lateral stretch ratio in the first tenter was changed to 4.1 times, and the relaxation ratio in the second tenter was 2.5%. The results of evaluation are shown in TABLE 3. An excellent film well balanced in shrinkage finish property, perforation-opening ratio, and a rupture elongation in the width direction after aging was obtained.

Example 3

A biaxially stretched film having a thickness of approximately 30 μm was obtained in the same manner as in Example 1 except that the thickness of the unstretched was changed to 285 μm, the longitudinal stretch ratio was changed to 2.5 times, and the relaxation ratio in the second tenter was 5%. The results of evaluation are shown in TABLE 3. An excellent film well balanced in shrinkage finish property, perforation-opening ratio, and a rupture elongation in the width direction after aging was obtained.

Example 4

A biaxially stretched film having a thickness of approximately 30 μm was obtained in the same manner as in Example 1 except that the thickness of the unstretched was changed to 203 μm, and the longitudinal stretch ratio was changed to 1.5 times. The results of evaluation are shown in TABLE 3. An excellent film well balanced in shrinkage finish property, perforation-opening ratio, and a rupture elongation in the width direction after aging was obtained.

Example 5

A biaxially stretched film having a thickness of approximately 30 μm was obtained in the same manner as in Example 1 except that the temperature in the second tenter was changed to 160° C. The results of evaluation are shown in TABLE 3. An excellent film well balanced in shrinkage finish property, perforation-opening ratio, and a rupture elongation in the width direction after aging was obtained.

Example 6

A biaxially stretched film having a thickness of approximately 30 μm was obtained in the same manner as in Example 1 except that the thickness of the unstretched was changed to 189 μm, the lateral stretch ratio was changed to 3.5 times in the first tenter, and the relaxation ratio was changed to 10% in the second tenter. The results of evaluation are shown in TABLE 3. An excellent film well balanced in shrinkage finish property, perforation-opening ratio, and a rupture elongation in the width direction after aging was obtained.

Comparative Example 1

A uniaxially stretched film having a thickness of approximately 30 μm was obtained in the same manner as in Example 1 except that the thickness of the unstretched film was changed to 60 μm, the process in the first tenter was omitted, and the longitudinal stretching temperature was 85° C. The results of evaluation are shown in Table 3. The film was inferior in perforation-opening ratio and rupture elongation in the width direction after aging as compared to Example 1.

Comparative Example 2

A biaxially stretched film having a thickness of approximately 30 μm was obtained in the same manner as in Example 1 except that the temperature of the second tenter was 110° C. The results of evaluation are shown in Table 3. The film had a high shrinkage in the longitudinal direction at 90° C., and was inferior in shrinkage finish property as compared to Example 1.

Comparative Example 3

A biaxially stretched film having a thickness of approximately 30 μm was obtained in the same manner as in Example 1 except that the material ratio of mixing of polyester 1, polyester 2 and polyester 3 was changed to 68:7:25 at a weight ratio. The results of evaluation are shown in Table 3. The film was inferior in tensile rupture elongation in the width direction after aging, and deterioration of the film after time was concerned as compared to Example 1. Also, the static electricity at the wound off, was generated highly.

Comparative Example 4

The ratio of mixing of polyester 1, polyester 2 and polyester 3 to be charged into the extruder, was changed to 86:7:7 at a weight ratio. The thickness of the unstretched film was changed to 198 μm, and the lateral stretch ratio stretch ratio in the first tenter was changed to 3.3 times. Then the film was stretched 2.0 times except that the surface temperature of the film was changed to 105° C. in the longitudinal stretching machine. A biaxially stretched film having a thickness of approximately 30 m was as obtained in the same manner as in Example 1 except that, the temperature in the second tenter was changed to 125° C. The properties of the film thus obtained were evaluated by the method described above. The results of evaluation are shown in TABLE 3. A problem was left for deterioration after time at a high temperature. Also, the static electricity at the wound off, was generated highly.

TABLE 3

|  | Thickness (μm) | Refractive index | | Hot air heat shrinkage (%) | | | Tensile rupture strength (MPa) Width direction | Tensile rupture elongation (%) T | |
|  |  | | | 90° C. | 140° C. | | | | |
|  |  | Longitudinal direction | Width direction | Longitudinal direction | Longitudinal direction | Width direction |  | Before aging Width direction | After aging Width direction |
| Example 1 | 30 | 1.62 | 1.64 | 1 | 30 | 1 | 310 | 127 | 45 |
| Example 2 | 30 | 1.61 | 1.64 | 1 | 30 | −4 | 290 | 135 | 40 |
| Example 3 | 30 | 1.63 | 1.63 | 0 | 24 | 2 | 260 | 160 | 28 |
| Example 4 | 30 | 1.6 | 1.66 | 4 | 37 | 0 | 360 | 115 | 70 |
| Example 5 | 30 | 1.63 | 1.65 | 0 | 18 | −1 | 320 | 105 | 30 |
| Example 6 | 30 | 1.61 | 1.63 | 0 | 28 | −5 | 220 | 180 | 30 |
| Comparative Example 1 | 30 | 1.6 | 1.56 | 2 | 33 | −3 | 40 | 280 | 15 |
| Comparative Example 2 | 30 | 1.61 | 1.64 | 9 | 34 | 2 | 300 | 130 | 45 |
| Comparative Example 3 | 30 | 1.61 | 1.63 | 3 | 32 | 1 | 250 | 150 | 20 |
| Comparative Example 4 | 30 | 1.62 | 1.65 | 4 | 35 | 0 | 290 | 110 | 38 |

|  | Right-angled tearing strength (N/mm) Width direction | Thickness unevenness (%) Longitudinal direction | Haze (%) | Dynamic friction coefficient | Static electricity at the wound off (kV) | Shrinkage finish property | Defective ratio of perforation- opening (%) |
| --- | --- | --- | --- | --- | --- | --- | --- |
| Example 1 | 160 | 8 | 5 | 0.38 | 3 | Good | 4 |
| Example 2 | 165 | 8 | 6.2 | 0.41 | 2.6 | Good | 6 |
| Example 3 | 190 | 6 | 5 | 0.37 | 2.8 | Good | 10 |
| Example 4 | 140 | 10 | 8.5 | 0.35 | 3.3 | Good | 2 |
| Example 5 | 155 | 9 | 8.5 | 0.3 | 2.2 | Good | 4 |
| Example 6 | 250 | 10 | 6 | 0.39 | 3.5 | Good | 10 |
| Comparative Example 1 | 450 | 27 | 4.5 | 0.47 | 4 | Good | 50 |
| Comparative Example 2 | 160 | 8 | 4 | 0.4 | 3.3 | Poor | 6 |
| Comparative Example 3 | 230 | 12 | 8.2 | 0.42 | 7 | Good | 8 |
| Comparative Example 4 | 190 | 11 | 8.2 | 0.4 | 6 | Good | 8 |

INDUSTRIAL APPLICABILITY

The heat-shrinkable polyester film according to the present invention possesses the excellent processing properties as described above, and is therefore suitable for use in a jacket label of a battery or similar applications.

EXPLANATION OF REFERENCE CHARACTERS

F film.

The invention claimed is:
1. A heat-shrinkable film consisting of a polyester, wherein the polyester consists of (i) ethylene terephthalate as a major constituent and (ii) an amount from 0 mol % to less than 1 mol %, based on the polyester as a whole, of a monomer component capable of forming an amorphous component, and wherein the film satisfies the following requirements (1) to (4):

(1) the film has a heat shrinkage of not less than −1% and not more than 5% in a longitudinal direction when treated for 5 minutes in a hot air oven at 90° C.;
(2) the film has a heat shrinkage of not less than 15% and not more than 40% in a longitudinal direction when treated for 5 minutes in a hot air oven heated to 140° C.;
(3) the film has a heat shrinkage of not less than −5% and not more than 5% in a width direction when treated for 5 minutes in a hot air oven heated to 140° C.; and
(4) the film has a rupture elongation of not less than 25% and not more than 80% in a film width direction after being aged for 672 hours in a thermo-hygrostat set at 60° C.

2. The heat-shrinkable polyester film according to claim 1, wherein the film has a tensile rupture strength of not less than 200 MPa and not more than 400 MPa in the width direction.

3. The heat-shrinkable polyester film according to claim 2, wherein the film has a refractive index of not less than 1.62 and not more than 1.66 in the width direction.

4. The heat-shrinkable polyester film according to claim 3, wherein the film has a haze of not less than 2% and not more than 12%.

5. The heat-shrinkable polyester film according to claim 4, wherein the film has a dynamic friction coefficient of not less than 0.1 and not more than 0.7 between one surface of the film and a back surface thereof.

6. The heat-shrinkable polyester film according to claim 5, wherein the film has a static electricity of 5 kV or less at the time when a product roll is wound off at a speed of 200 m/min after being aged for 672 hours in an environmental test chamber set at 60° C.

7. The heat-shrinkable polyester film according to claim 1, wherein the film has a refractive index of not less than 1.62 and not more than 1.66 in the width direction.

8. The heat-shrinkable polyester film according to claim 1, wherein the film has a haze of not less than 2% and not more than 12%.

9. The heat-shrinkable polyester film according to claim 1, wherein the film has a dynamic friction coefficient of not less than 0.1 and not more than 0.7 between one surface of the film and a back surface thereof.

10. The heat-shrinkable polyester film according to claim 1, wherein the film has a static electricity of 5 kV or less at the time when a product roll is wound off at a speed of 200 m/min after being aged for 672 hours in an environmental test chamber set at 60° C.

* * * * *